United States Patent [19]

Buksek

[11] Patent Number: 4,703,783

[45] Date of Patent: Nov. 3, 1987

[54] APPARATUS FOR EQUALIZING THE DEPOSITION OF A PARTICLE MASS

[75] Inventor: Andrej Buksek, Darmstadt, Fed. Rep. of Germany

[73] Assignee: Carl Schenck AG., Fed. Rep. of Germany

[21] Appl. No.: 1,706

[22] Filed: Jan. 9, 1987

[30] Foreign Application Priority Data

Jan. 20, 1986 [EP] European Pat. Off. ........ 86100658.3

[51] Int. Cl.[4] ........................ B29C 31/00

[52] U.S. Cl. ........................ 141/83; 177/119; 198/505; 425/140

[58] Field of Search .................. 137/8, 89; 141/1, 83; 177/50, 60, 82, 119, 121; 198/502.2, 504, 505, 634, 635; 425/140, 141; 222/55

[56] References Cited

U.S. PATENT DOCUMENTS

| | | | |
|---|---|---|---|
| 1,840,455 | 1/1932 | Lea | 222/55 X |
| 2,822,024 | 2/1958 | Himmelheber et al. | 177/82 X |
| 3,146,909 | 9/1964 | Sawada | 222/55 |
| 3,513,961 | 5/1970 | Franklin | 222/55 X |
| 3,557,889 | 1/1971 | Rejsa | 141/83 X |
| 4,038,531 | 7/1977 | Loe, Jr. | 141/83 X |
| 4,257,518 | 3/1981 | Stock et al. | 222/55 X |
| 4,514,348 | 4/1985 | Iguchi et al. | 425/141 X |

FOREIGN PATENT DOCUMENTS

| | | | |
|---|---|---|---|
| 249437 | 9/1960 | Australia | 141/131 |
| 109456 | 5/1984 | European Pat. Off. . | |
| 947640 | 3/1956 | Fed. Rep. of Germany . | |
| 1133532 | 1/1957 | Fed. Rep. of Germany . | |
| 2528391 | 12/1976 | Fed. Rep. of Germany . | |

*Primary Examiner*—Henry J. Recla

*Assistant Examiner*—Mark J. Thronson

*Attorney, Agent, or Firm*—Connolly and Hutz

[57] ABSTRACT

The spread of particles which might otherwise be unevenly deposited upon a moving surface is equalized in accordance with a rated density distribution of the particle mass. The density distribution is determined across the particle mass and the particle distribution is varied so that the stream deposited upon the moving surface is uniform and in accord with a given density distribution.

11 Claims, 9 Drawing Figures

APPARATUS FOR EQUALIZING THE DEPOSITION OF A PARTICLE MASS

BACKGROUND OF THE INVENTION

The present invention relates to a method for the equalization of particles to be deposited and/or spread upon a moving surface. Equalization is according to a rated density distribution in a particle mass stream in a direction transverse to movement of the mass stream. A device for the application of the method includes means for controlling the volume of the particle mass stream to be deposited depending on a rated density distribution in the stream across its spread width, especially a chip mass stream used in the manufacture of chip boards, particle boards, and the like.

In the production of masses consisting of particles for compacting into boards, the particles already mixed with bonding agents are deposited upon a base surface. The quality of the boards produced by the compacting process depends to a large degree upon a uniform density of the deposited particle mass over the base surface. In this respect it is of no consequence whether the bonding agent mixed with the particles to produce the mass is urea type glue, cement or gypsum.

The particle material may also consist of wood chips of normal dimensions, as needed for manufacturing of chip boards or it may consist of larger surface particles such as wafers and strands or it may consist of a mixture of such chips and wood fibers. The particles to be deposited may also be synthetic granules.

DE-PS No. 1 133 532 makes known a means for forming a particle stream of constant thickness especially wood particles such as chips mixed with bonding agents to form a furnish. Several sensing devices are provided at locations before portioning which are distributed over the width of a conveyor belt with respect to the direction of belt advancement.

When a given height of particle mass exceeds the nominal height, control devices are activated with respect to a distribution device that equalizes the uneven heights of deposited particle mass across the conveyor width. Such a device can only be applied if, before the portioning procedure, there is a large amount of material available as compensatory material to compensate for the equalization of the material to be spread. Accordingly, newly arriving and to be proportioned material is being mixed with already available material. The result is that the material actually used consists of particles that were furnished with bonding agents at different times. For instance particles that were in contact with cement, and in addition have been moistened, and as a result have experienced curing of the cement, will be brought together with particles that were freshly mixed with cement as a bonding agent.

The influence of such a particle mixture upon the strength of the board produced is detrimental. The results are obvious, namely particles already furnished and thereby coated with cured bonding agents cannot bond further with particles that were freshly coated with bonding agents. Hence, despite equal density in the deposited mass the finished boards become scrap because of flawed bonding. This disadvantage of the state of technology demonstrated in the example of a board with cement bonding applies also to chip boards of the type explained above and to particle boards the bonding of which is accomplished with gypsum or to boards made of granules.

In DE-PS No. 947 640 a method and means is disclosed for the manufacture of particleboards, chip boards and the like wherein the particle or chip material is deposited upon roller or belt conveyors, grids or similar means including sheet metal covers which may be attached thereto. The resulting particle mass after scraping off excess material before or after precompression is subjected to continuous and automatic weight control by means of height adjustment of the scraper. The adjustment is made in accordance with indications by a weighing scale to achieve manufactured boards of equal weight.

This method also uses an excess amount of particles whereby, depending on the weight of the particle mass after spreading, some particles must be removed in order to achieve equal weight. Besides destroying the surface of the evenly spread particle mass as a result of this interference, the same disadvantages occur as mentioned above regarding the current state of the art. Also an even distribution of density cannot be achieved in this manner if mixed materials are used, such as particles of different kinds of wood or wood particles mixed with granules. This is so because of the different specific weights in the particle mixture and also as the result of minor variations in the wood mixture. For example, wood particles of higher specific gravity and granules of synthetic material of low specific gravity will necessarily combine over the total spread of deposited mass thereby resulting in a nonuniform density distribution.

SUMMARY OF THE INVENTION

With the above as background, it is an object of the present invention to avoid the problems of the prior art by providing a method and apparatus for achieving constant density in the production of particleboards and the like.

A method and apparatus is disclosed for achieving a uniform rated density in a deposited particle mass even if the amount of material to be distributed exceeds the amount of particles needed for achieving the rated density. This method avoids mixing of the excess amount as it is returned with the material to be spread or with the material already spread. These objectives are achieved with a method for equalizing the particles which are being spread in excess amounts for the desired rated density distribution for a given particle mass transverse to the direction of advancement of the mass.

The inventive method steps include initially spreading a partial quantity of the particle mass, distributing a further quantity during the spreading operation according to the varying actual density distribution of the mass, and guiding the remaining particle quantity toward reuse. This results in a production method which, on the one hand yields uniform density throughout the mass and on the other hand avoids mixing of particles that were exposed to bonding agents for different lengths of time. Also no further disturbance of the surface of the deposited mass is necessary.

A device is provided having a discharge unit from which a particle stream to be deposited is discharged onto a depository that moves underneath the discharge unit. Such deposition may consist of partially overlapping cauls or a forming belt onto which a continuous particle mass with a predetermined width of spread is deposited. The proportions of the spread width depend on the rated density distribution over the width of the spread. The particle mass stream reaches the depository uninfluenced in its composition and where corrections are necessary in order to achieve rated density over the total spread width, particle amounts are added to or removed from the stream. Gates are arranged along the width of the stream in accordance with the invention and these gates either close or open to supply compensatory material where needed. In those cases where the width of the particle stream includes excess portions, such excess is removed from the stream and directly guided to reprocessing before the stream is deposited upon the repository.

Special conveyor systems are also particularly designed for transporting and directing the particle mass, and various devices are useful for recycling excess material before deposition upon the forming structure. A transport screw may be used for removing particle material from the source of the compensatory material.

The invention herein also includes a mechanism for actuating the compensatory or add gates in accordance with measured actual values in the particle stream as compared to rated values. In this case the measured actual value in the deposited particle mass is used with the aid of a computer to actuate the gates so that the very next deposited particle mass has a rated value when measured.

BRIEF DESCRIPTION OF THE DRAWING

Novel features and advantages of the present invention in addition to those noted above will become apparent to those of ordinary skill in the art from a reading of the following detailed description in conjunction with the accompanying drawing wherein.

DETAILED DESCRIPTION OF THE INVENTION

Figure 1:
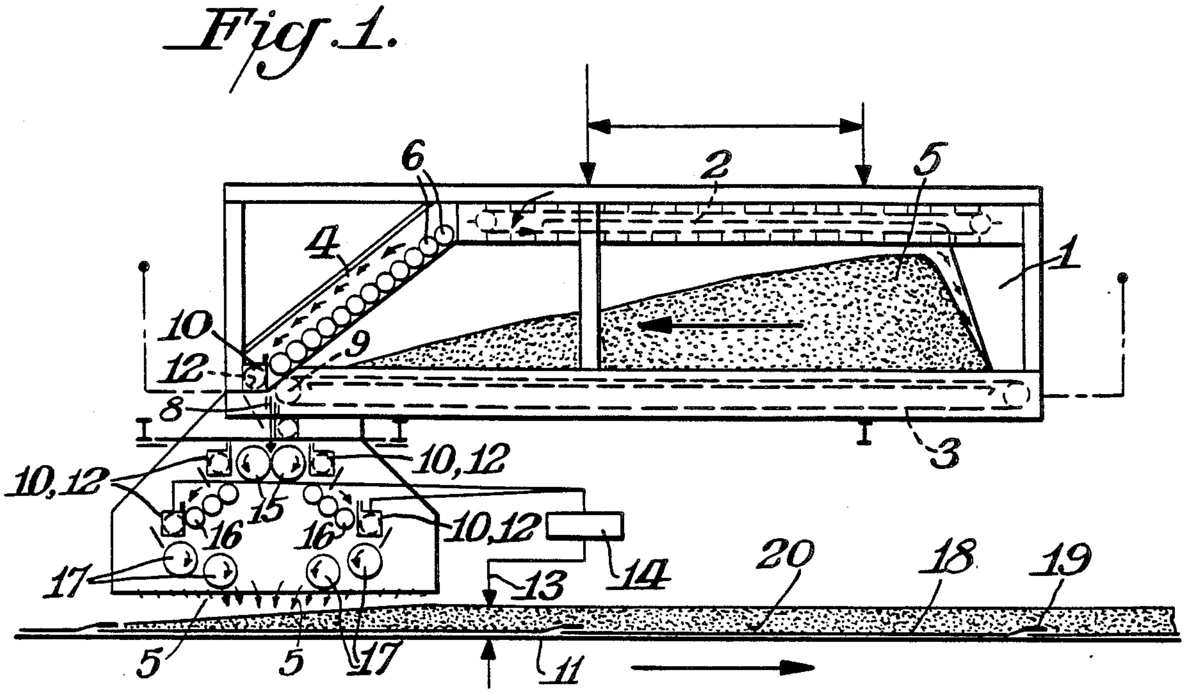
FIG. 1 is a side elevational view with portions broken away of a storage container from which particles are drawn and deposited upon a conveyor via a distribution device.

Referring in more particularity to the drawing, FIG. 1 shows a storage container 1 for receiving via entrance 2 the particles to be distributed. The particles may be wood or synthetic chips that may already be provided with processed urea type glue or with dried out particles such as gypsum or cement for the purpose of mutual reinforcement of the chips against the influence of the humidity contained in chips. Also, mixtures of wood and synthetic chips may be introduced into the container whereby the synthetic chips cause a strengthening of the wood chips as is the case in the manufacture of board-like products where a heated press compresses the chip mass.

The storage container also includes a belt 3 at the bottom thereof which closes off the container and at the same time transports the particles as a result of movement of the belt 3 in the direction of the arrow toward a scraper 4. The scraper 4 consists of a series of scraper rollers 6 which are arranged along an incline and which, because of their rotation in the direction of the arrows supply a distribution device 7 with particles taken from the particle supply. The result is a closed particle stream which moves between the front roller 9 of the bottom belt 3 and the housing 10 which, as does the scraper roller 6, extends over the full width of the storage container. The distance between the front roller 9 of the bottom belt 3 and the housing 10 is such that the majority of the closed particle stream passes through this opening without hindrance. The volume of the closed particle stream 8 is controlled so as to contain an excess amount compared with the chip mass to be deposited onto a forming belt 11.

The housing 10 also contains a transport unit 12 which extends over the total width of the container and therefore also over the total width of the flowing particle mass exiting the storage container. Transport unit 12 serves the purpose of a controlled subtraction or addition of particles from the closed particle stream 8. The transport unit 12, explained in more detail below, is located inside the housing 10 wherein it proportions particles toward the distribution device 7 according to information received from the density measuring device 13 and a computer 14. These particles are added to closed particle stream 8.

The several housings 10 and several transport units 12 shown in FIG. 1 indicate possible locations for the devices consisting of housing 10, transport unit 12 and openings in housing 10 which openings may be closed by means of gates for adding to and subtracting from the closed particle stream. If the housing is located near the front roller 9 of the bottom belt 3 then further housings 10 should not be arranged in the course of the particle stream. However according to the invention further housings 10 may also be arranged in the area of the distribution device 7 either above the rollers 15 or a single housing 10 below the front roller 9 which withdraws the required and correct amount from the excess of the closed particle stream 8 to obtain an actual density distribution in the mass in accordance with rated values as determined by the density measurement device 13.

Alternatively, in accordance with the invention, a housing 10 may be provided after each roller 15 which also would withdraw from the excess the rated density for the mass. In another variation at the end of each series of transport rollers 16, a housing 10 with a transport unit 12 therein may be arranged which transfers from the excess, as explained above, the amount of particles that corresponds to rated density, to the distribution rollers 17.

The arrangement according to the invention whereby housing 10 with transfer unit 12 is located at the end of transfer roller 16 is advantageous where danger of demixing exists in the course of the particle stream from the scrape rollers 6 to the roller 17. This is especially so in cases of very different specific weights between the bonding agent and the particles to be bonded if the bonding agent is not yet attached to the particles to be bonded.

In case of processed urea type glues, the particles to be bonded, i.e. chips, will be already coated with glue while in the storage container 1 so that a demixing of these components cannot take place. In this case it is particularly preferred to arrange the housing 10 opposite to the front roller 9. In case of granulates or dust type bonding agents such as gypsum or cement in dry condition, i.e. not moistened, it is advantageous to carry the excess up to shortly before rollers 15 and to withdraw there the amount for the correct rated density.

The particles are deposited by means of the distribution rollers 17 upon the forming belt 11 in the form of a cascade, as shown in FIG. 1.

Instead of just a forming belt 11, a sequence of mutually overlapping plates or cauls 18 may be provided which in case of a flexible embodiment include cover lips 19. The particle mass 20 deposited on cauls 18 or forming band 11 has a uniform rated density over its width of spread and is further processed into board type materials.

Figure 2:
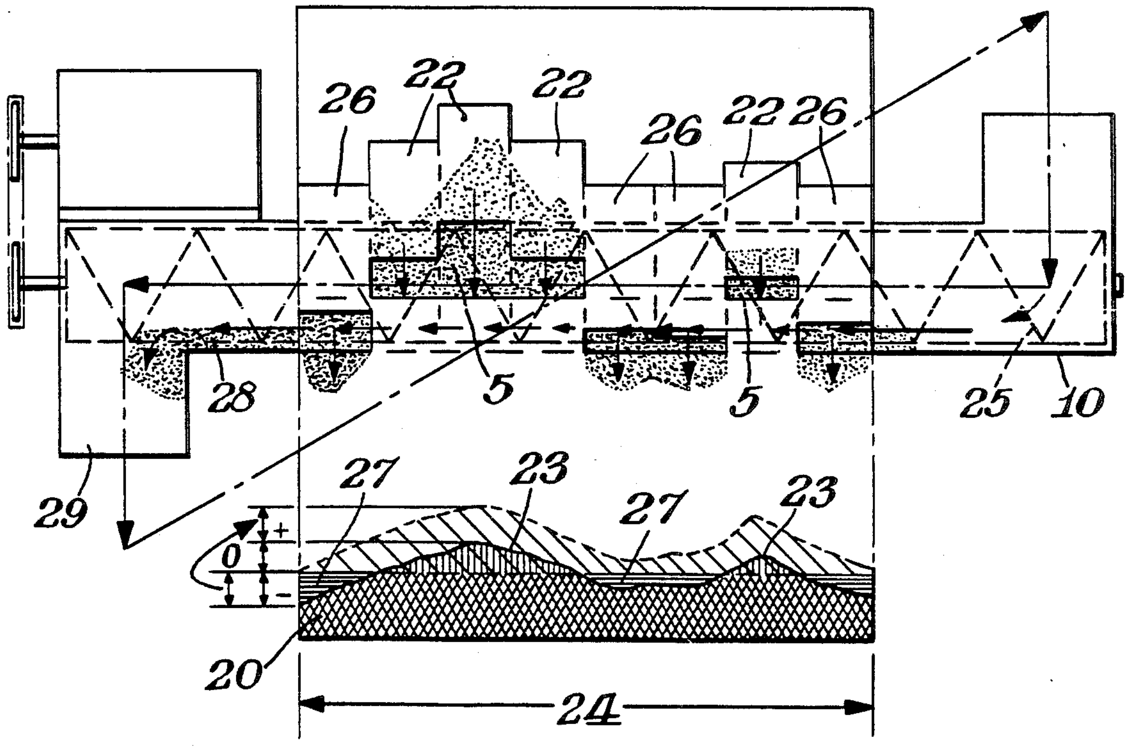
FIG. 2 is a schematic view illustrating a series of gates the positions of which depend upon the measured density distribution in the deposited particle mass.

FIG. 2 schematically shows the position of the gates 22 which according to the trend of the particle mass 23 in this area over the width of spread, allow the superfluous particles 5 to enter into the housing 10 and thus deliver them to a transfer screw 25. The gates 26 for adding material make adding of particles to the mass 20 out of housing 10 possible by means of the rotating transfer screw 25 if a negative trend in the mass is present. The rotating transfer screw 25 and the housing 10 which extend beyond the width of spread in order that excess particle material 28 still present even after portioning, can be carried off through opening 29 in the housing located outside the spread width 24 and can be reintroduced for instance into the storage container 1 via the particle circuit.

Figure 3:
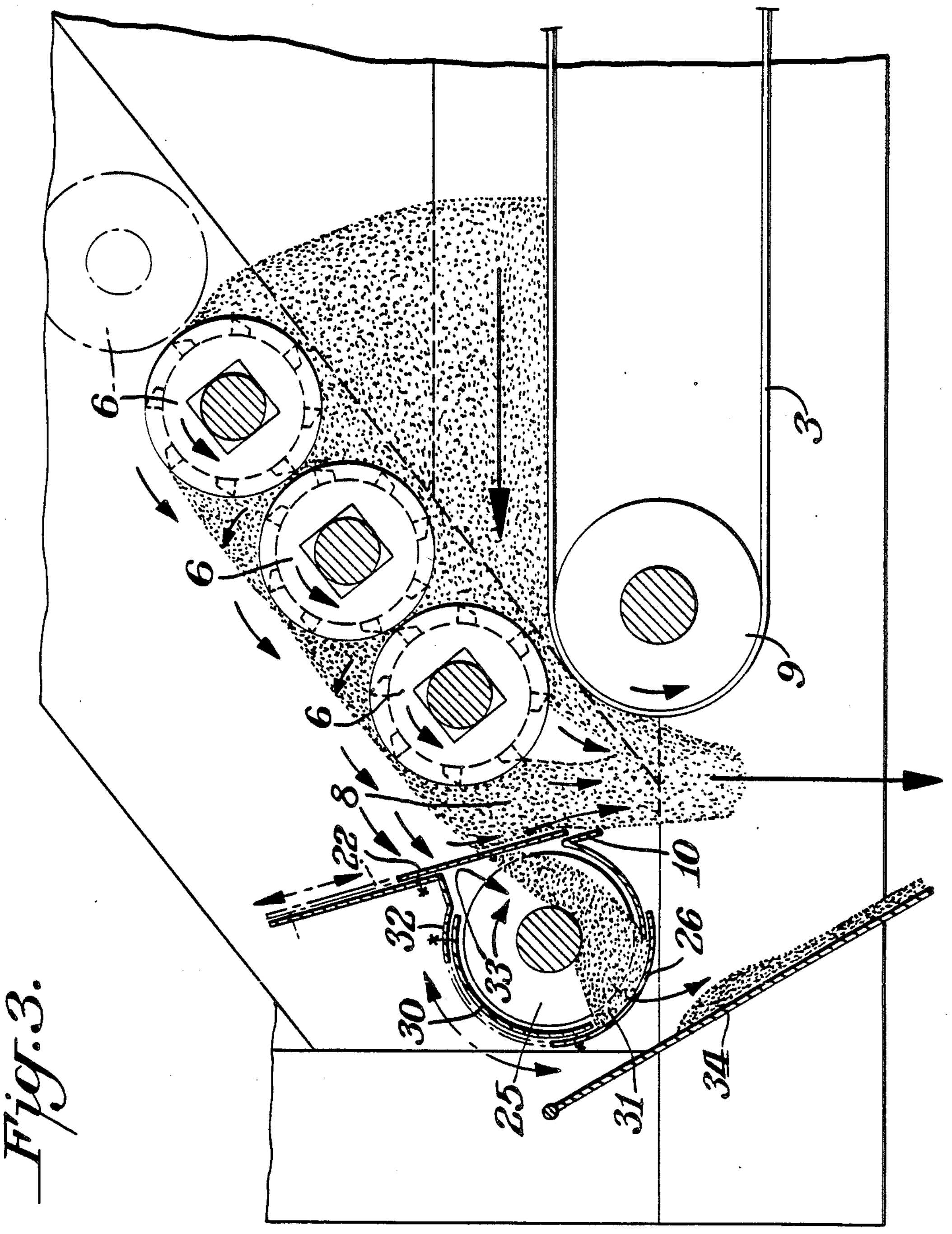
FIG. 3 is an enlarged side elevational view of the delivery device for the particle mass stream.

FIG. 3 shows the closed particle stream 8 carried away by the scraper rollers 6. The stream is transported between the front roller 9 of the bottom belt 3 and the housing 10. Housing 10 has a circular portion 30 with several "add-gates" 26 which selectively open and/or close "add-slots" 31 fitted into the circular form over the spread width according to the information obtained from the thickness measurements of the deposited mass. Inside the housing 10 is a transport device in the form of a rotating transport screw 25. In the embodiment example according to FIG. 3, the gate 22, which is in the plane of the drawing, closes off the "withdraw-gate" or opening 32.

Through the open gate 22 which is located behind gate 32, a partial particle stream 33 is admitted into the housing 10 and is, as already shown in FIG. 2, either transported to a place where there is a negative trend in the deposited mass or this partial particle stream 33 is removed through the opening 29 at the end of the transport screw 25. FIG. 3 shows that housing 10 is in the edge sphere of the still closed particle stream and is arranged in the direction of advancement of the mass stream.

In the area of the housing 10 and behind same there is a guide flap 34 that causes the total portioned particle stream to be deposited in the mass stream.

Figure 4A:
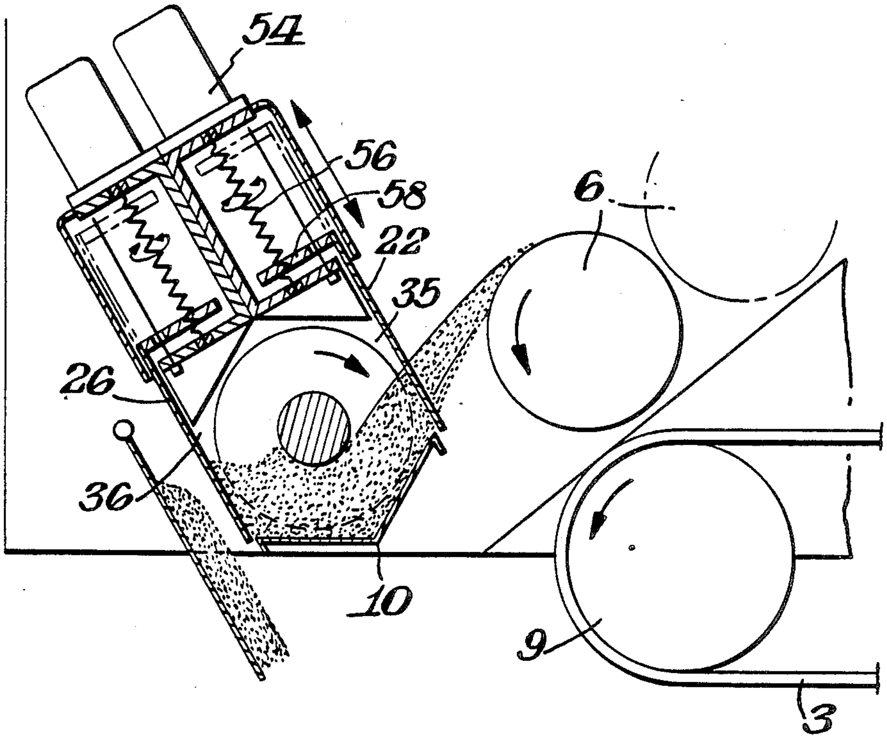
FIG. 4*a* shows a delivery housing similar to FIG. 3 but having a generally hexagonal shape.

FIG. 4a shows an embodiment of a housing in hexagonal form whereby parallel sides 35,36 of the housing may be alternatively closed and opened through gate 22 and "add-gate" 26, respectively. An embodiment of the housing in this form affords simplification of the mechanical guidance, as well as easier manufacturing and adjustment of the individually actuated gates 22 and the individually actuated add-gates 26.

Figure 4B:
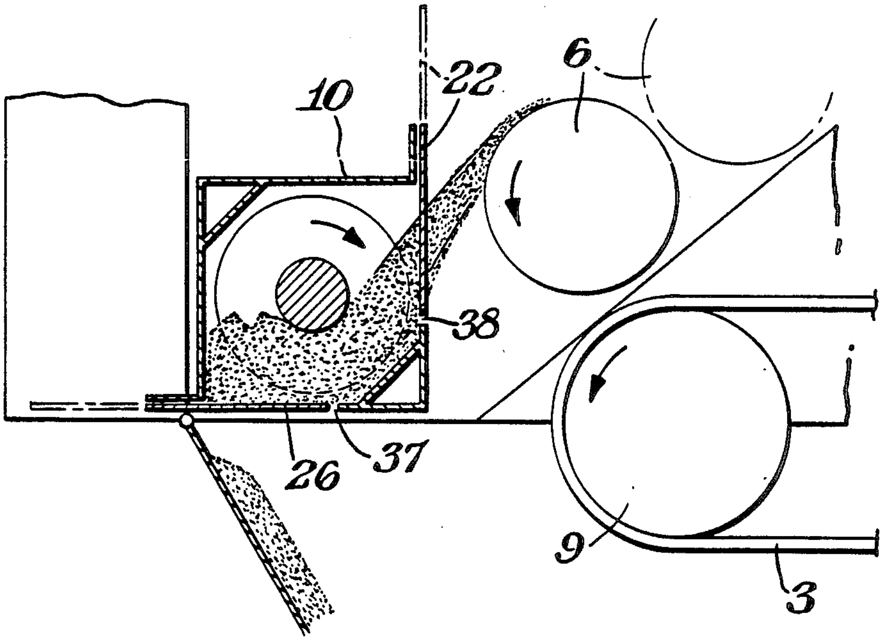
FIG. 4*b* is a view similar to FIG. 4*a* but showing another embodiment of the delivery housing having a generally square shape.

FIG. 4b shows a square housing 10 whereby the gates 22 and 26 alternatively open and close slots in adjacent sides 37,38. Such embodiments are especially suitable, as is also shown in FIG. 1, for the incorporation of housing 10 and transfer unit 12 in the area of the transfer rollers 16 and distribution rollers 15.

Figure 4C:
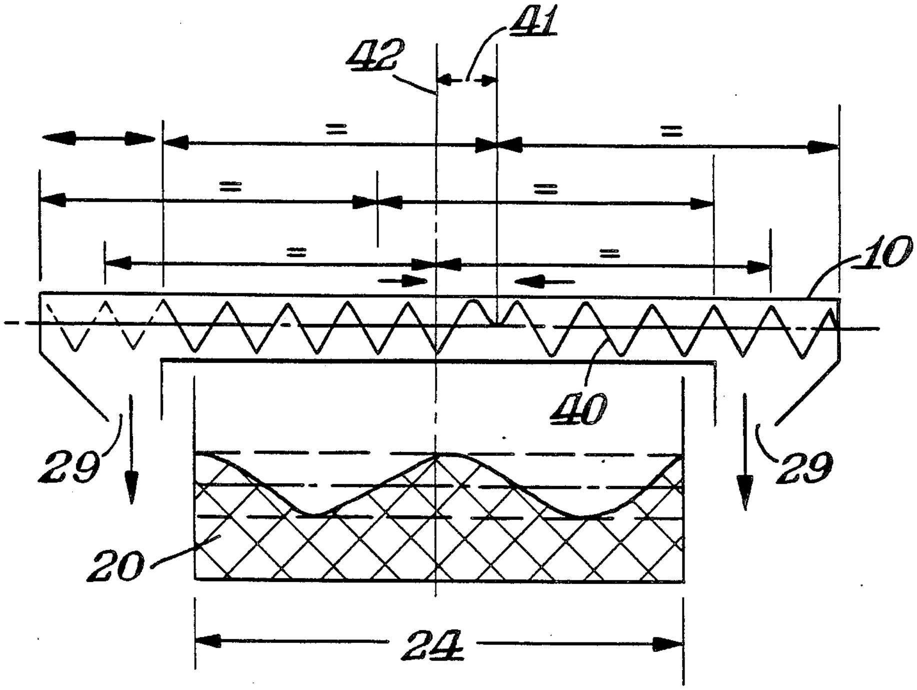
FIG. 4*c* shows a transport screw for moving and removing material from the delivery housing.

FIG. 4c illustrates the housing 10 with a transport screw 40 having an opposite pitch at each side thereof. In addition, this opposite pitch transport screw 40 may be shifted by an amount 41 away from the center of the width of the spread. The opposite pitch starts in the center of the transport screw 40, so that excess particle material from the area left and right beyond the width of the spread may be removed from housing 10 through opening 29.

Figure 4D:
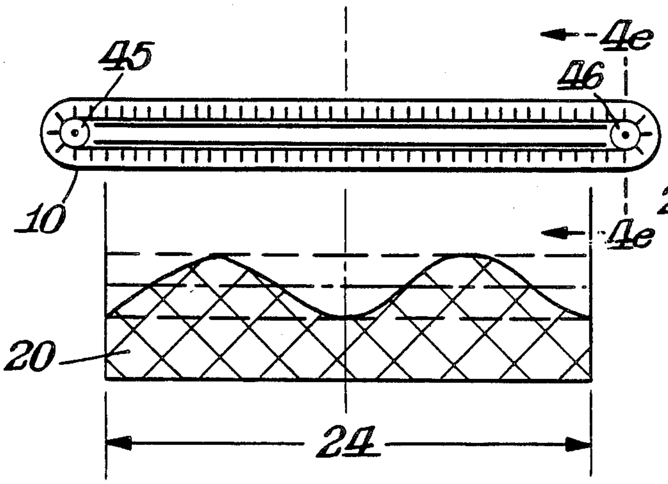
FIG. 4*d* shows another arrangement for moving and removing material from the delivery housing.
Figures 4E, 4F:
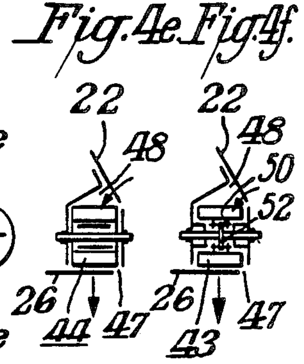
FIG. 4*e* is a sectional view taken along line 4*e*—4*e* of FIG. 4*d*.
FIG. 4*f* is a view similar to FIG. 4*e* but showing a modified drive.

FIGS. 4d and 4e show a closed excess particle circuit. A scraper transfer unit 43 or a clearout belt 44 moving as an endless transport device around opposed rollers 45,26 is arranged inside housing 10. The housing 10 has a slot 47 in its bottom portion that extends over the total width of spread. This slot may be opened and closed by means of several "add-gates" 26 arranged over the total width of the spread. Upstream, the housing also has a slot extending over the total spread width. Such slot is arranged in the slanted roof 48 which also may be closed off by means of several gates 22. In this way a reduction of particle material upstream and an addition of particles downstream can be effected for the same particle stream so that the rated density will be achieved in particle mass 20 as seen over its spread width.

FIG. 4f simply shows another embodiment similar to FIGS. 4d and 4e but having a chain 50 and sprocket 52 type drive for the scraper belt. Otherwise the arrangements are the same.

Gates 22 and 26 may be opened and closed by any suitable means, one such means being illustrated in FIG. 4a. Specifically, a reversing motor 54 rotates a screw 56 threaded into an arm 58 connected to the gate. Depending upon the direction of rotation of motor 54, gate 22 is either opened or closed in a manner clearly shown in FIG. 4a. This particular mechanism may be used with any of the gates 22 and 26 disclosed herein.

FIG. 2 shows a plurality of upstream gates 22 arranged across the spread width of the particle stream. Eight such gates are shown. Also, an equal number of downstream or add-gates 26 are arranged across the spread width. In those instances where excessive amounts of material exist in the particle stream, appropriate upstream gates 22 are opened to divert material from the stream into the housing 10. The material within the housing serves as a compensatory reserve for adding particle material to the stream at those locations where a deficiency 27 is noted. Once the location of such deficiency is determined, the appropriate add-gate or gates 26 are opened so that material within the housing is delivered to the particle stream prior to deposition thereof on the moving forming belt 11 or cauls 18.

Control of the gates may be accomplished with the aid of a sensor such as 13 and computer 14. In the particular embodiment illustrated and described therein, sensor 13 makes eight independent determinations across the spread width of the deposited particle mass, each such location corresponding to one of the upstream gates 22 and its aligned add-gate 26. These eight determinations are then compared with target values in the computer and where excessive amounts of material are found appropriate upstream gates 22 are opened to divert material from the stream to the housing and thereby reduce such excesses in the deposited particle mass. Likewise, where the determinations are less than the target values, appropriate downstream or add-gates 26 are opened to bring the particle amounts at those locations up to the target value.

What is claimed:

1. Apparatus for equalizing the density distribution across a continuous particle stream having a given spread width comprising a primary particle mass supply, means for flowing a stream of particles from the primary supply to a point of deposit, continuously moving receiver means at the point of deposit constructed and arranged to receive the particle stream, a housing disposed adjacent the flowing particle stream and extending across the spread width thereof, the housing having a plurality of upstream gates arranged across the spread width of the stream each constructed to divert particle mass from the stream into the housing when opened, the housing also having downstream gates arranged across the spread width of the stream each constructed to add particle mass from the housing to the stream when opened, and control means for opening and closing the gates in a manner that equalizes the density distribution across the continuous particle stream.

2. Apparatus as in claim 1 wherein the moving receiver means includes a forming belt onto which the particle stream is deposited.

3. Apparatus as in claim 1 wherein the moving receiver means includes a plurality of cauls arranged in end-to-end fashion and slightly overlapping one another.

4. Apparatus as in claim 1 wherein the housing includes conveyor means therein for continuously moving the particle mass diverted into the housing.

5. Apparatus as in claim 4 wherein the conveyor means comprises a rotating transport screw.

6. Apparatus as in claim 5 wherein the rotating transport screw has equal half lengths of opposite screw pitch.

7. Apparatus as in claim 4 wherein the conveyor means comprises an endless belt with scraper elements mounted thereon.

8. Apparatus as in claim 1 wherein the housing includes means for removing excess particle material therefrom and recycling such removed material.

9. Apparatus as in claim 1 wherein the housing has side walls defining a polygonal cross section with the upstream gates comprising portions of one of the side walls and the downstream gates comprising portions of another side wall.

10. Apparatus as in claim 9 wherein the cross section of the housing is square.

11. Apparatus as in claim 1 wherein the control means includes a sensor for determining the actual density of the deposited particle mass at selected locations across the spread width, computer means for comparing the actual density determinations with target values therefor, and means constructed and arranged (1) to open selected upstream gates at those locations where the actual density is excessive to thereby divert material from the stream into the housing and (2) to open selected downstream gates at those locations where the actual density is low to thereby add material from the housing to the stream.

* * * * *